US005373765A

United States Patent [19]

Asano et al.

[11] Patent Number: 5,373,765

[45] Date of Patent: Dec. 20, 1994

[54] APPARATUS FOR DRIVING TWO TOOL PARTS FOR PUNCHING, CUTTING AND STAMPING

[75] Inventors: Kazuo Asano; Toshihiro Takai, both of Nagoya, Japan

[73] Assignee: Tsukishima Kikai Co., Ltd., Tokyo, Japan

[21] Appl. No.: 102,310

[22] Filed: Aug. 5, 1993

[30] Foreign Application Priority Data

Aug. 7, 1992 [JP] Japan .......... 4-232834

[51] Int. Cl.$^5$ .......... B26D 5/08; B23D 15/02; B30B 1/18

[52] U.S. Cl. .......... 83/623; 72/408; 83/631; 83/698.71; 100/264; 100/290

[58] Field of Search .......... 83/631, 623, 698.71; 100/264, 290; 72/408

[56] References Cited

U.S. PATENT DOCUMENTS

| | | | |
|---|---|---|---|
| 1,457,265 | 5/1923 | Peck | 83/631 |
| 3,030,842 | 4/1962 | Goltermann | 83/631 |
| 3,148,574 | 9/1964 | Heigl et al. | 83/635 |
| 3,376,728 | 4/1968 | Nemessányi | 83/631 |
| 3,971,275 | 7/1976 | Mach | 83/635 |
| 4,881,399 | 11/1989 | Bocharov et al. | 83/631 |
| 5,123,342 | 6/1992 | Camossi | 83/631 |

FOREIGN PATENT DOCUMENTS

| | | |
|---|---|---|
| 0381770 | 8/1990 | European Pat. Off. . |
| 429373 | 9/1911 | France . |
| 8707979 | 8/1987 | Germany . |
| 58-143909 | 8/1983 | Japan . |
| 1416129 | 12/1975 | United Kingdom . |

OTHER PUBLICATIONS

Patent Abstracts of Japan, vol. 7, No. 261 (m-257) (1406) 19 Nov. 1983 (JP-A-58-143,909).

*Primary Examiner*—Hien H. Phan

[57] ABSTRACT

An apparatus for driving upper and lower tool parts for punching, cutting and stamping, and more particular to such an apparatus using a rotary screw rod and a nut member threadedly engaging with the screw rod so as to move up or down therealong. The apparatus comprises a pair of reversible small power prime movers, a plurality of screw rod pairs, each of which consists of a first screw rod having an unthreaded extension and a hollow second screw rod embracing the unthreaded extension therein so as to freely rotate relative to the first screw rod, a pair of means for transmitting rotary forces from the pair of prime movers respectively to the first screw rods and to the hollow second screw rods, a plurality of nut member pairs, each of which consists of a first nut member and a second nut member respectively threadedly engaged with the first and second screw rods so as to move up or down when the screw rods are rotated in a first or second direction therealong, first and second tool parts respectively connected to the first and second nut members so as to move toward or apart with each other.

4 Claims, 6 Drawing Sheets

APPARATUS FOR DRIVING TWO TOOL PARTS FOR PUNCHING, CUTTING AND STAMPING

FIELD OF THE INVENTION

The invention relates to an apparatus for driving upper and lower tool parts for punching, cutting and stamping, and more particular to such an apparatus using not a piston-cylinder device but a rotary screw rod and a nut member threadedly engaging with the screw rod so as to move up or down therealong.

BACKGROUND OF THE INVENTION

The apparatus using an upper and lower ball screw rod, of which thread cut directions are opposite with each other and an upper and lower nut member threadedly engaging respectively therewith and mounted respectively with an upper and down table respectively carrying an upper and down tool part has been actually used and in public knowledge.

However, in such apparatus the upper and lower tool parts are symmetrically moved toward or apart with each other always at a same rate. Those skilled in the art may understand that it is necessary or preferable to drive the two tool parts asymmetrically so to speak in such engineering work. For instance, one part only is moved while the other is stopped, one part is slowly moved but the other is rapidly moved, or the two parts are time-differentially moved.

SUMMARY OF THE INVENTION

It is an object of the invention to provide an apparatus for driving two tool parts for punching, cutting and stamping, which is capable of asymmetrically moving the upper and lower tool parts.

The object can be attained fundamentally by using a ball screw rod pair comprising a first ball screw rod having an unthreaded extension and a hollow second ball screw rod embracing the unthreaded extension so as to allow relative rotation and a pair of prime movers, e.g. servomotors through a pair of transmitting systems for separately rotating said first and second screw rods.

DETAILED EXPLANATION OF PREFERRED EMBODIMENT

Figure 1:
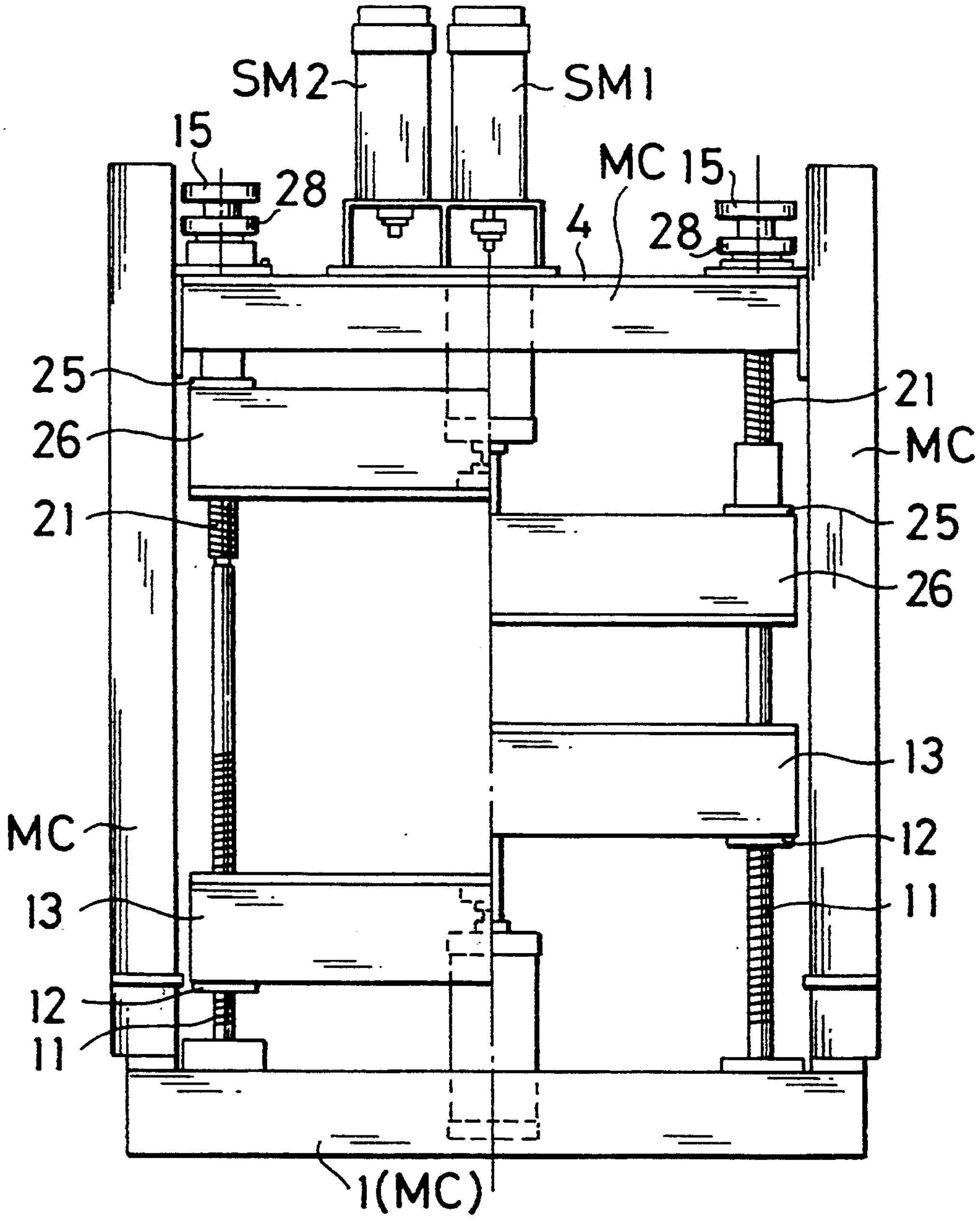
FIG. 1 is a side elevation of a preferred embodiment of the mold clamping apparatus according to the invention, in which a lower mold and table mounted therewith as well as an upper mold and table mounted therewith are shown in engaged state in the right half, while in the left half they are shown in disengaged state.
Figure 2:
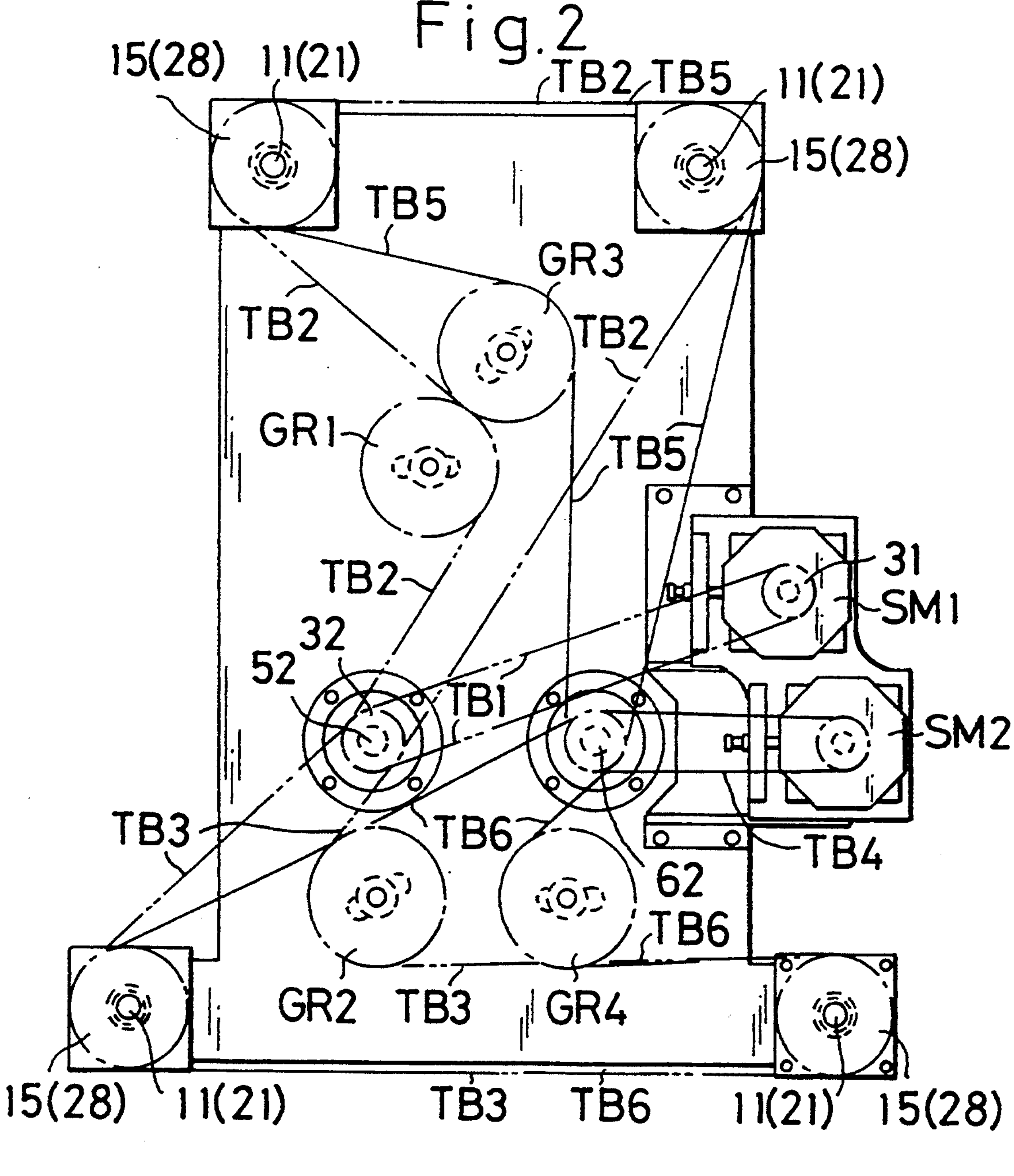
FIG. 2 is a plan view of the above.
Figure 3:
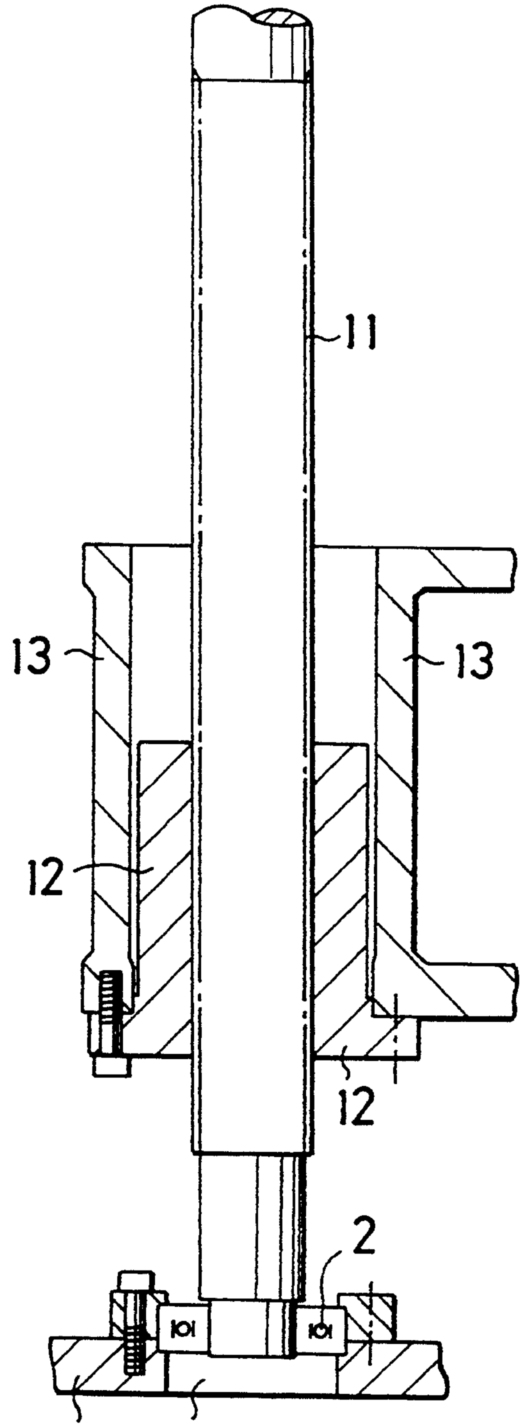
FIG. 3 is a side elevation partly in section of a lower first ball screw rod in a larger scale.

In reference to FIG. 1, a base bed 1 as a part of the machine casing MC supports four first ball screw rods 11 (arranged at four corners of the machine casing MC, see FIG. 2). In reference to FIG. 3, each of the ball screw rods 11 is supported at the lower end by a bearing 2 for rotation, which is mounted around the periphery of a groove 3 formed in the base bed 1.

There is threadedly mounted a nut member 12 on the ball screw rod 11 (balls arranged therebetween not illustrated) so as to move up or down therealong, when the screw rod 11 is rotated by means of a first reversible servomotor SM1 (see FIG. 1). This is applied also to the other three rods 11. A first table 13 is fixed to the four nut members 12 so that a lower or first tool part (not shown) may be removably or exchangeably mounted thereon.

Figure 4:
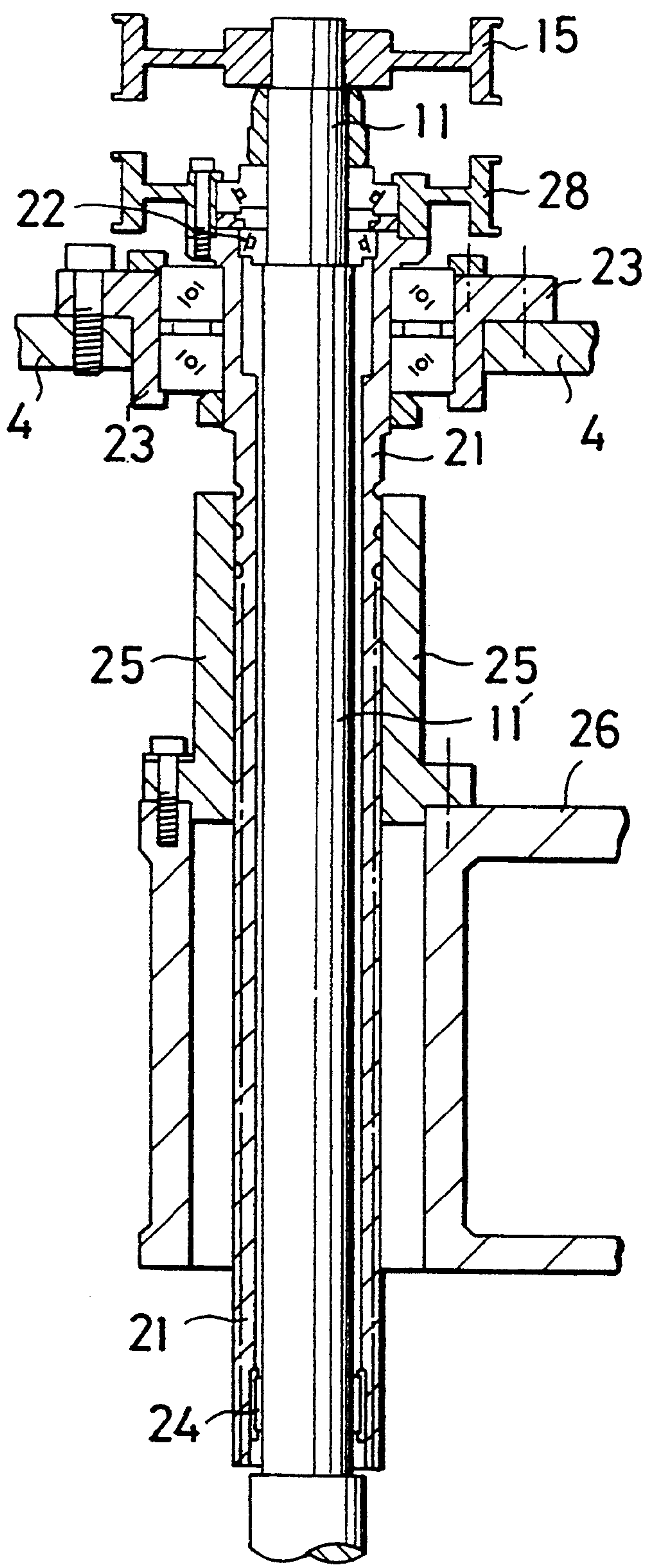
FIG. 4 is a similar view of an upper and hollow second ball screw rod embracing an unthreaded extension of the lower screw rod so that they may relatively rotate with each other.

Now in reference to FIG. 4, a hollow second screw rod 21 is supported by an upper tapered bearing 22, which is fixed to a crown member 4 as a part of the machine casing MC via a flanged ring 23, and embraces an unthreaded extension 11' of the first screw rod 11 so as to relatively rotate with each other. A needle bearing 24 is preferably arranged at the lower end of the second screw rod 21 between the inner peripheral surface thereof and the outer peripheral surface of the first screw rod extension 11'.

A second nut member 25 is threadedly engaged with the second screw rod 21 so as to move up or down when the rod 21 is rotated in one or other direction by means of a second reversible servomotor SM2. This is applied also to the other three screw rods 21. A second table 26 is fixed to the four nut members 25 so that a second or upper tool part (not shown) may be removably or exchangeably mounted thereunder.

Figure 5:
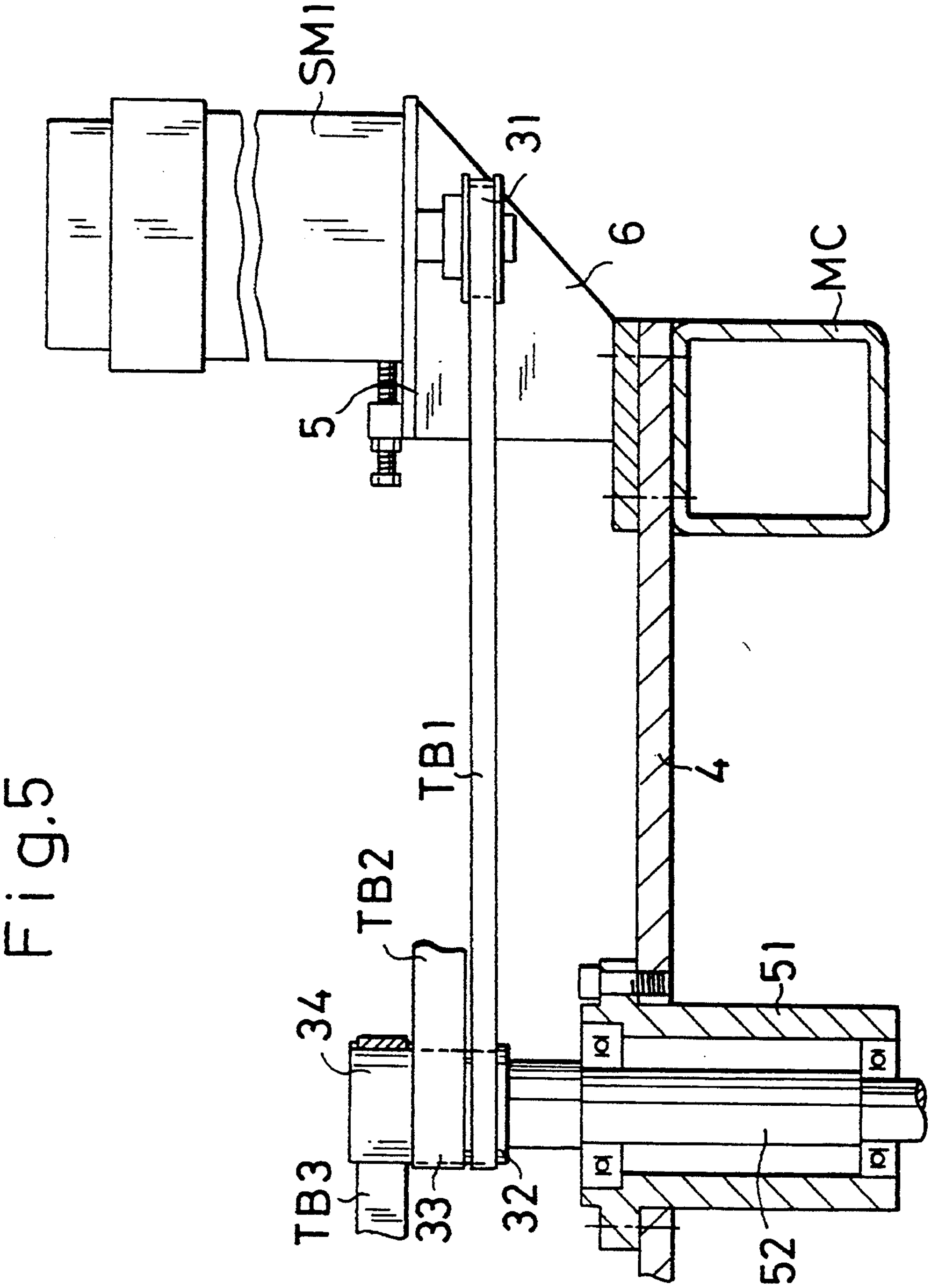
FIG. 5 is a front elevation of a first servomotor and a cylindrical casing having a rod for rotation therein as transmission mechanism shown partly cut off and partly in section.

It is noted here that thread cutting direction of the second screw rod 21 is made opposite to that of the first screw rod 11 so that when the second table 26 is lowered by rotation of the former screw rod then the first table 14 may be raised by rotation of the latter to be appreciated when force transmitting mechanism is explained later in reference to FIG. 5 and FIG. 6.

The unthreaded extension 11' of the first screw rod 11 is provided at the upper end with a first belt pulley 15 and the second screw rod 21 is provided with a second belt pulley 28 thereunder in concentricity therewith for the purpose of drivingly rotating them.

It is noted here that the pulleys 15, 28 of the two screw rods 11 (21), 11(21)shown above in FIG. 2 are arranged at a level a little higher than those shown below as seen from comparing the left pulleys 15, 28 with those shown at the right, by reason to be made clear when explaining FIGS. 5 and 6.

The reversible servomotors SM1 (FIG. 5) and SM2 (FIG. 6), which are numerically controlled by a computer (not shown), are respectively mounted on a plate 5 which is fixed to the crown member 4 so as to protrude the respective motor shafts downward, on which belt pulleys 31 and 41 are respectively mounted.

There are provided a first and second cylindrical transmission casings 51 (FIG. 5) and 61 (FIG. 6), each of which has a rod 52 and 62 respectively for rotating therein. The rotatory rods 52, 62 are respectively connected at the lower end with free wheeling clutches for the purpose to be explained later. The free wheeling clutch CL2 for the rod 62 is shown in FIG. 6. The free wheeling clutch for the rod 52 is the same with the clutch CL2 and connected thereto likewise.

The rod 52 is mounted at the upper portion protruded out of the casing 51 with a pulley 32 at the same level as the pulley 31 on the motor shaft so that a timing belt TB1 is extended therearound for rotating the rod 52 in either direction by the reversible motor SM.

The rotating rod 52 is provided with a further pulley 33 above the pulley 32 so that a timing belt TB2 is extended around the pulley 33 and the upper pulleys 15, 15 of the two screw rods 11, 11 shown above in FIG. 2 via a guide roller GR1 so as to drive these two screw rods 11, 11 for rotation.

The rotating rod 51 is provided with a still further pulley 34 above the pulley 33 so that a timing belt TB3 is extended around the pulley 34 and the upper two pulleys 15, 15 mounted at a level higher than the above two pulleys on the first screw rods 11, 11 shown below in FIG. 2 via a guide roller GR2 so as to drive these two screw rods 11, 11 for rotation.

Figure 6:
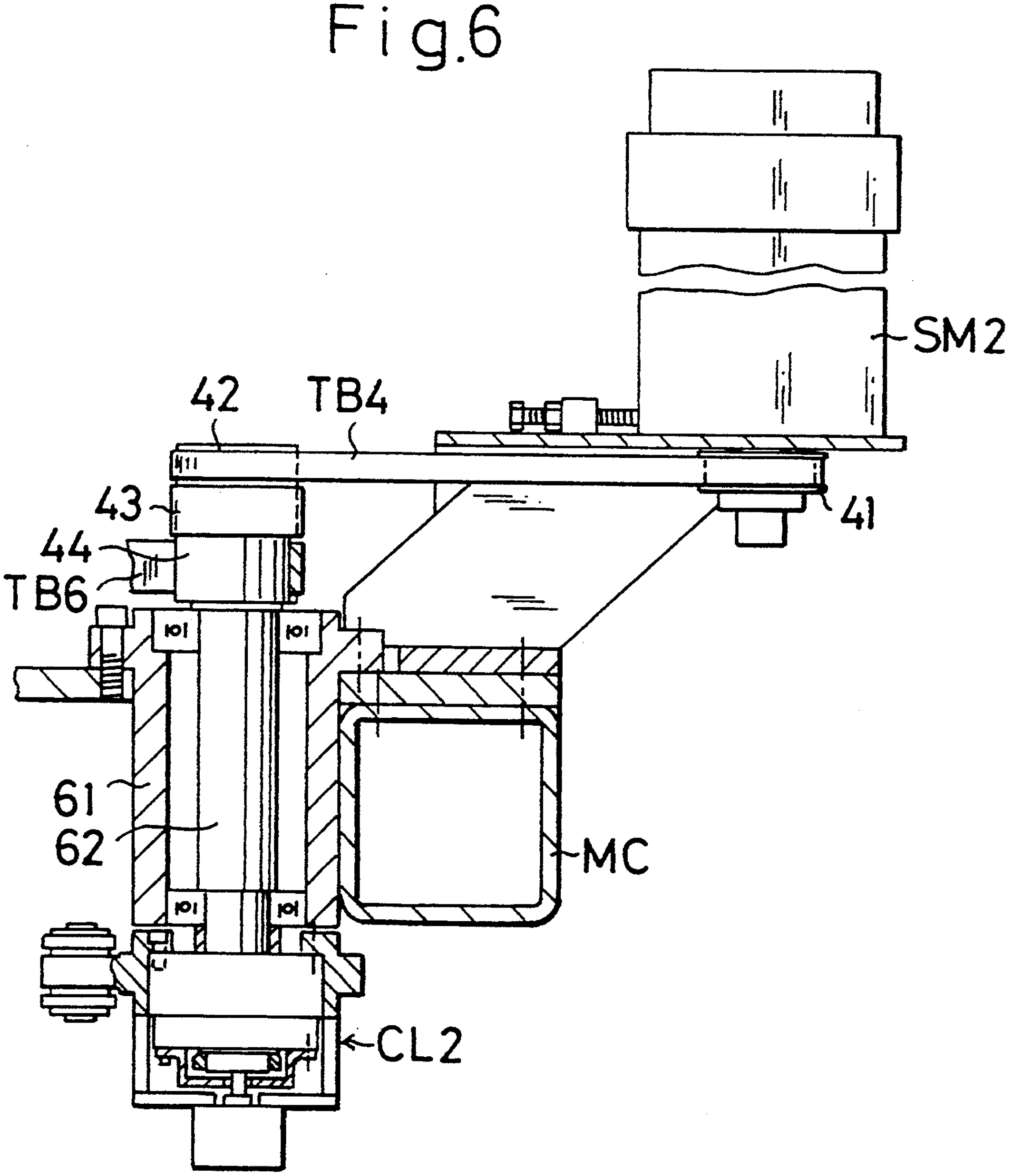
FIG. 6 is a similar view of a second servomotor and the corresponding transmission mechanism.

Now in reference to FIG. 6, similarly a pulley 41 is mounted on an output shaft of the SM2. A rotary rod 62 is similarly mounted in a transmission casing 61 and provided with a pulley 42 so that a timing belt TB4 is extended around this pulley 42 and the motor shaft pulley 41 so as to drive the rod 62 for rotation.

The rod 62 is mounted with a further pulley 43 below the above pulley 42 and a still further pulley 44 below the further pulley 43. A timing belt TB5 is similarly extended around the further pulley 43 and the pulleys 28, 28 of the second screw rods 21, 21 shown above in FIG. 2 via a guide roller GR3 for rotating these hollow screw rods. A timing belt TB6 is similarly extended around the still further pulley 44 and the pulleys 28, 28 of the two second screw rods 21, 21 shown below in FIG. 2 via a guide roller GR4 for rotating these hollow screw rods.

Thus, when the servomotors SM1, SM2 are energized to rotate respectively in one direction, the lower tool part and the upper tool part are respectively moved toward each other for engagement, while when rotating in the other direction the both tables 13, 26 are moved for disengagement so as to take out the tooled product and supply new material to be tooled therebetween. Since there are provided the two motors SM1, SM2 for driving the upper and lower tables 13, 26 independently, the tools respectively fixed thereto may be asymmentrically moved up and down as occasion demands.

What is claimed is;

1. An apparatus for driving upper and lower tables on which tool parts are mounted comprising:

a plurality of screw rod pairs, each of which includes a first screw rod having an unthreaded extension and a hollow second screw rod coaxially embracing the unthreaded extension therein so as to be freely rotatable relative to the first screw rod;

a first servomotor for rotating the first screw rods and a second servomotor for rotating the second screw rods;

a pair of means for transmitting rotary forces from the first and second servomotors respectively to the first screw rods and to the hollow second screw rods;

a plurality of nut member pairs, each of which includes a first nut member and a second nut member respectively threadedly engaged with the first and second screw rods so as to move up or down when the screw rods are rotated in a first or second direction;

first and second tool parts respectively connected to the first and second nut members so as to move toward or apart with respect to each other.

2. The apparatus as claimed in claim 1, wherein four pairs of screw rods are arranged at four corners of a machine casing, wherein the first screw rod is supported for rotation at a lower end on a base bed as a part of the machine casing and has an upper unthreaded extension, and wherein the hollow second screw rod embraces the unthreaded extension therein and is rotatably held at an upper end by the machine casing.

3. The apparatus as claimed in claim 1, wherein said means for transmitting rotary force from the first and second servomotors comprises a plurality of belt pulleys, guide rollers, and timing belts each extended around a plurality of pulleys and guide rollers.

4. The apparatus as claimed in claim 3, wherein an output shaft of each of the servomotors is mounted with a pulley, wherein a rotary rod is held for rotation in a generally cylindrical casing, said rod being provided with a pulley so that an endless timing belt is extended around said output shaft pulley and the rotary rod pulley for rotating the rod, wherein the rotary rod is provided with a further pulley so that a second endless timing belt is extended around this further pulley and two pulleys respectively mounted on two of four screw rods via at least one guide roller and that the rotary rod is provided with a still further pulley so that a third endless timing belt is extended around this still further pulley and two other pulleys respectively mounted on the other two of said four screw rods via at least one guide roller.

* * * * *